G. F. BAGGE.
FLASH LETTERING MACHINE.
APPLICATION FILED APR. 18, 1914.
1,149,490.
Patented Aug. 10, 1915.
3 SHEETS—SHEET 1.
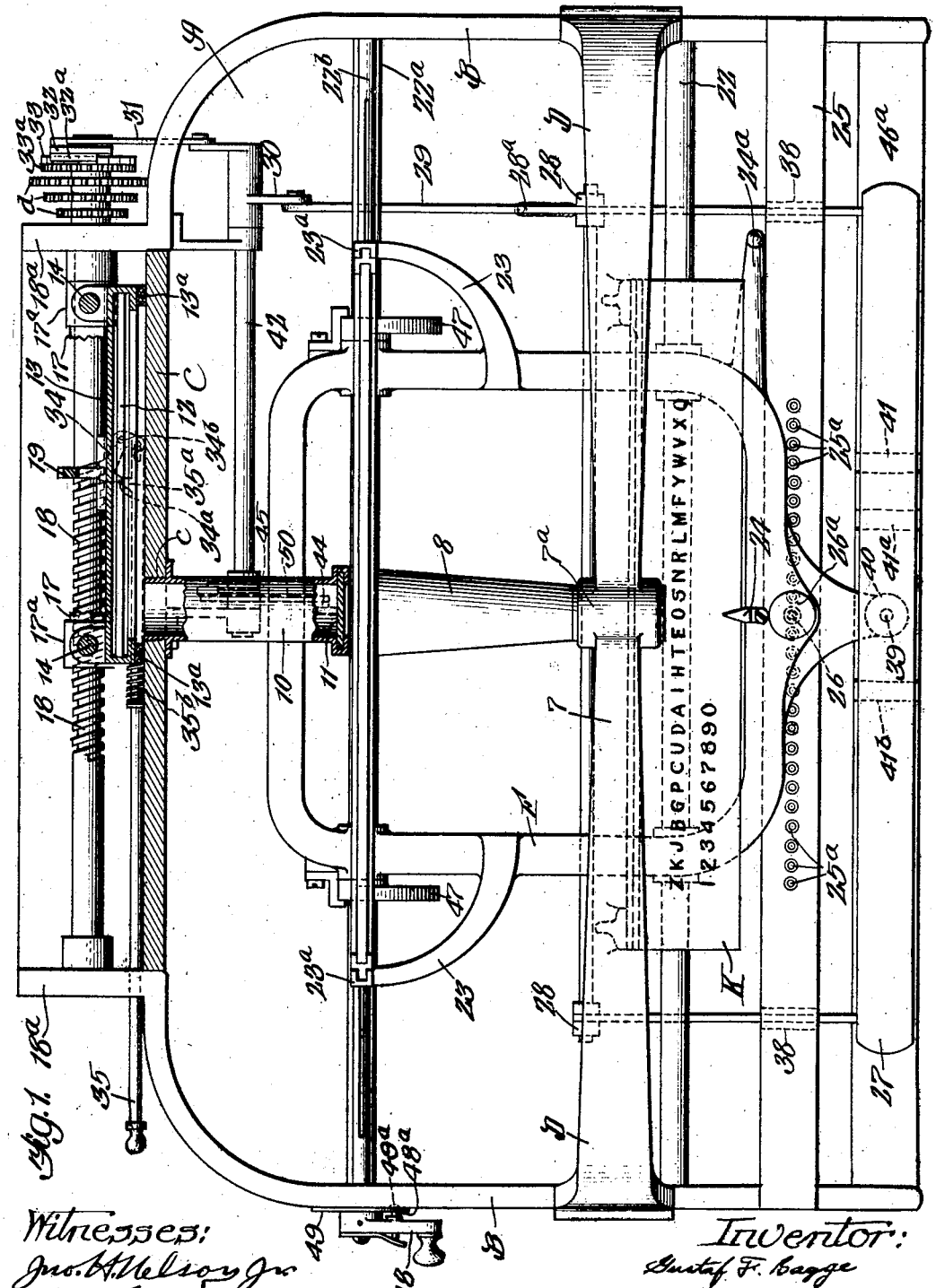
Witnesses:
Jno. H. Nelson Jr.
W. H. Fowkes.
Inventor:
Gustaf F. Bagge
by attys
Lynnestedt & Bradley

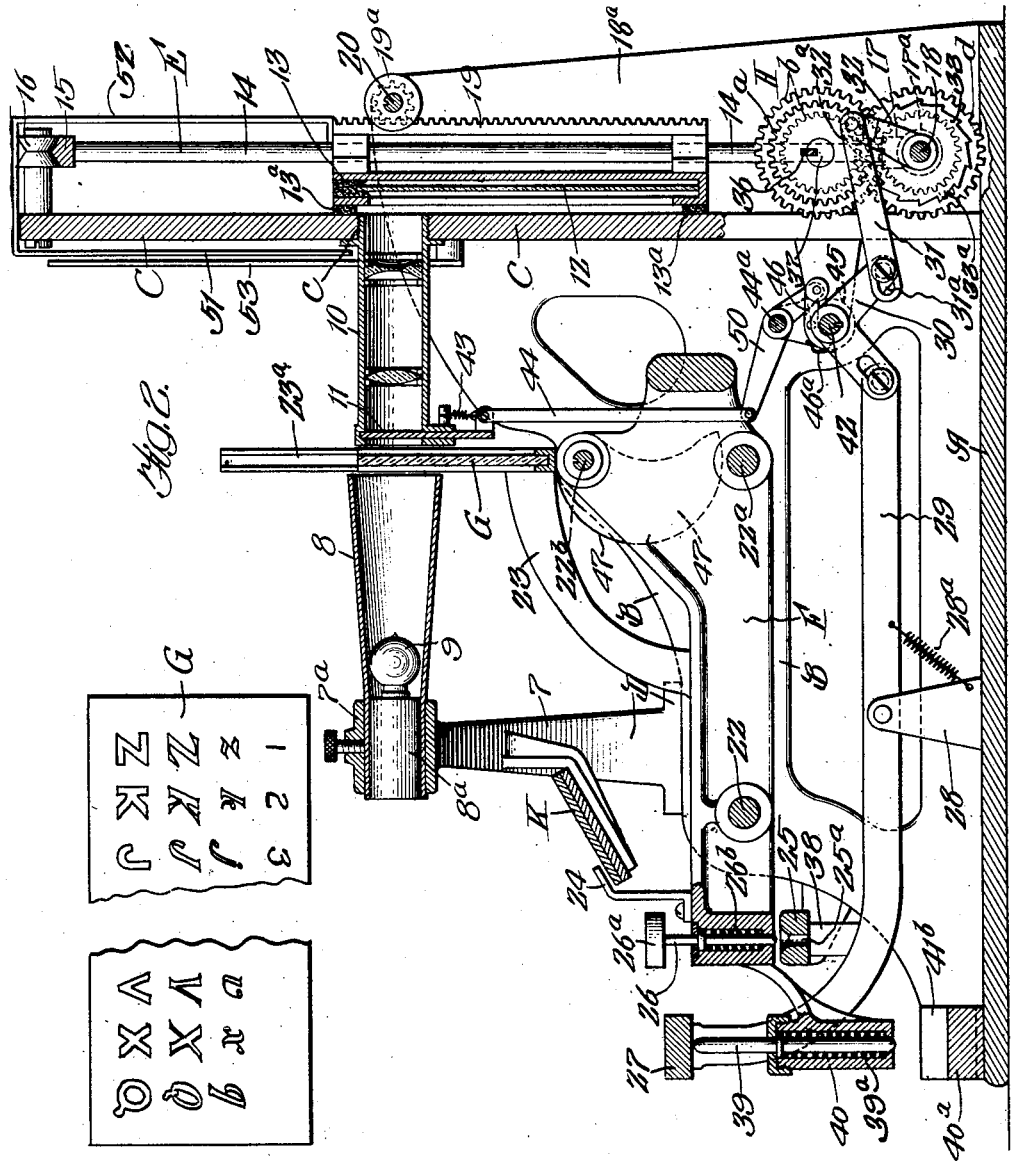

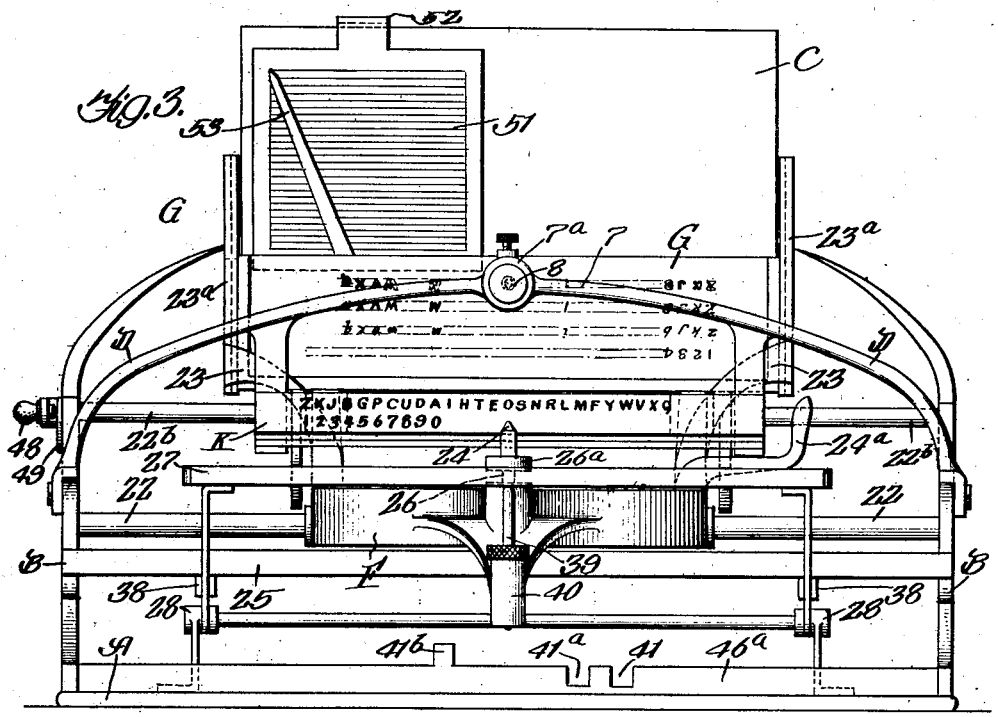
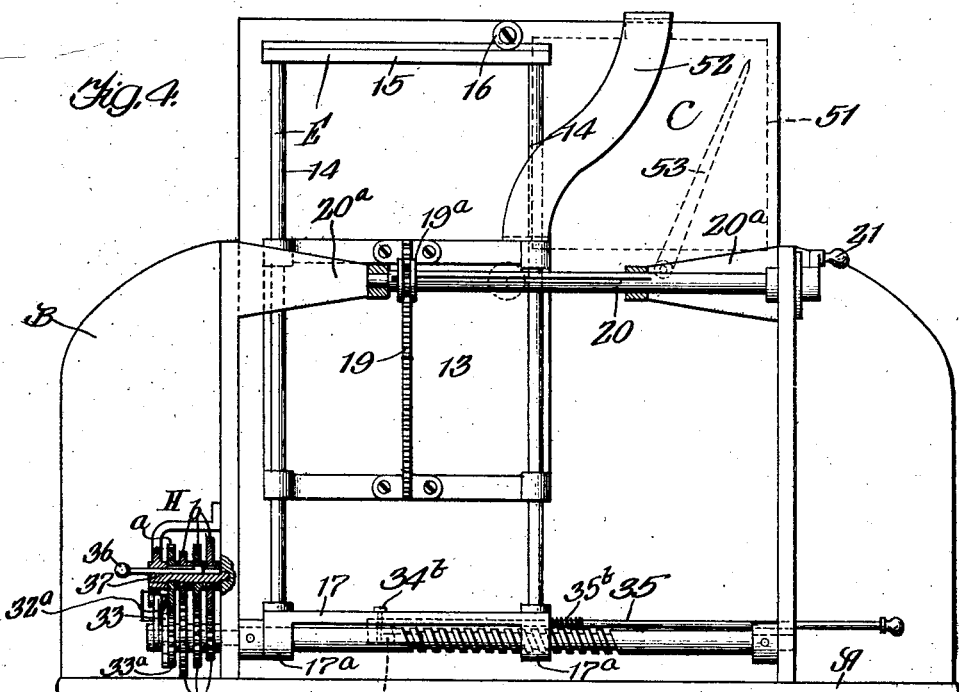

UNITED STATES PATENT OFFICE.

GUSTAF F. BAGGE, OF CHICAGO, ILLINOIS, ASSIGNOR TO ALPHAGRAPH MANUFACTURING COMPANY, OF CHICAGO, ILLINOIS, A CORPORATION OF ILLINOIS.

FLASH-LETTERING MACHINE.

1,149,490. Specification of Letters Patent. Patented Aug. 10, 1915.

Application filed April 18, 1914. Serial No. 832,683.

*To all whom it may concern:*

Be it known that I, GUSTAF F. BAGGE, a subject of the Kingdom of Sweden, and a resident of Chicago, in the county of Cook and State of Illinois, have invented a certain new and useful Flash-Lettering Machine, of which the following is a full, clear, and exact description, reference being had to the accompanying drawings.

My invention relates to a novel flash lettering machine, and has for its primary object the provision of a machine which is designed to produce in a rapid and economical manner photographically printed slides adapted for use more particularly as text and program slides in connection with projection apparatus.

Heretofore in producing a printed slide for use as a text or program slide in a projection lantern, it has been customary in obtaining the better class of work to have the text matter set up and then printed on a suitable back ground, and subsequently the printed text was photographed on a plate. An operation of this character required not only a great amount of time but also involved a considerable layout of detached and frequently unavailable apparatus, which necessarily resulted in a product so expensive in the aggregate as to be practically prohibitive for use by the smaller moving picture show proprietors.

It is my aim to provide a portable and compact slide lettering or printing machine which entirely overcomes these disadvantages; and also to provide a machine which may be easily and readily manipulated by any person to produce in a comparatively short space of time a slide containing any desired printed text. For example, my invention will enable the proprietor of a moving picture theater to quickly and cheaply produce at will slides containing public announcements, programs, songs, and the like; and on the other hand the film manufacturers will be enabled thereby to produce the descriptive text matter which usually accompanies a film story, and in a more available manner than has heretofore been possible.

These, together with such other objects and advantages as may hereinafter appear, or are incident to my invention, I attain by means of a construction illustrated in preferred form, wherein:—

Figure 1 is a top plan view of a machine embodying a preferred form of my invention;

Figure 2 represents a vertical section taken through Figure 1;

Figures 3 and 4 are front and rear elevations respectively of the showing in Figure 1;

Figure 5 represents an enlarged view of a detail of my invention, and

Figure 6 is a fragmentary portion of a preferred form of master plate.

In a broad sense, my invention comprises the provision of a machine of the character above described adapted for bringing a succession of selected letters or characters into the principal optical axis of a suitable lens, which letters or characters are designed to be photographically flashed for reproduction on a sensitive plate or film movable in the focal plane to receive in spaced relation the imprint of said letters or characters as they are brought up into the said axis.

In carrying out my invention I provide a frame comprising a bed plate or base A, side frame members B, back plate C, and a transverse bar member D extending between the side members B and disposed in front of the said back plate C. This transverse member D has mounted on it a pedestal 7 whose upper end is provided with a socket portion 7$^a$ which carries a projecting hood 8. Within the hood is a suitable radiant 9, which in this instance is shown as an ordinary electric light mounted within that portion 8$^a$ of the hood embraced by the socket 7$^a$. Disposed intermediate the hood and back plate C, and preferably in the axial line of the hood, is a casing or lens box 10 provided with suitable lens and having its rear open end fixedly received in an aperture $c$ formed centrally in the back plate, and its front end which is held away in spaced relation from the hood is provided with a suitable shutter device 11 mounted to normally close the front aperture.

I provide means, hereinafter described, which operate to bring up a selected letter or character into the axis at a point intermediate the radiant and lens box aperture for its reproduction on a suitable negative, such as the sensitive plate indicated at 12. The plate is carried at an appropriate focal distance in a plate holder 13 adapted to have horizontal and vertical movement in the focal plane of the lens through the provision of a frame E, which latter is so mounted at the rear of the back plate as to insure the plate holder 13 being held against the back plate, there being a marginal bearing strip 13ª of felt, or like material, interposed between the holder and back plate for the purpose of excluding light from the plate. This frame E preferably comprises the upright posts 14 connected at their upper ends by a bar 15 which engages a roller 16 mounted on the back plate, the lower ends of the post being similarly connected by the lower bar 17 provided with depending hubs 17ª through which freely extends a partial worm shaft 18 rotatively mounted in ears 18ª forming part of the side frame members B.

Referring more particularly to Figures 2 and 4 it will be seen that the plate holder 13 is slidably mounted for guided vertical movement on the upright posts 14 of the frame E, and is provided with a vertical rack 19 with which meshes a shrouded gear 19ª slidable on and rotatable with a splined shaft 20 mounted in the side frame bearings 20ª, the shaft being arranged for actuation by the hand lever 21. The means for moving the frame and with it the plate holder in a horizontal plane will be described hereinafter, but during such movement it will be obvious that the rack 19 carries the shrouded gear 19ª with it and along the splined shaft, and that both gear and rack are in constant operative relation irrespective of any positioning of the plate and its holder.

An important feature of my invention is the provision of mechanism adapted to successively bring into the axis any number of desired characters or letters for producing the imprint of the same on the plate. This mechanism is intended not only to actuate the shutter of the lens box but also serves to impart movement in a horizontal plane to the plate 12 for the purpose of receiving the imprint thereon of the letters in successive and properly spaced relation.

To this end I preferably provide a carriage F mounted for sliding movement in a horizontal plane on the alined shafts 22 and 22ª which have their ends received in the side members B, and above the shaft 22ª and passing through upwardly extended portions 23 of the carriage F is a third and splined shaft 22ᵇ whose ends are rotatively mounted in the side frame members. The carriage F proper approximates a hollow rectangular figure, and is adapted to freely move horizontally on its shafts between the side frame members, the forward portion being disposed beneath the transverse bar D and inclining rearwardly and upwardly therefrom to form the extended end portions 23 which are provided with the rabbeted wings 23ª, that serve as a holder for the master plate or like character bearing member indicated at G. A reference to Figures 2 and 3 clearly indicates the positioning of this master plate, which is arranged to extend vertically and intermediately of the radiant and the shuttered aperture of the lens box. In the preferred embodiment shown, the master plate consists of a glass plate having photographed thereon, in inverted form, alphabetical letters and characters arranged in alinement and in such relative order as may be desired. This plate may be made of any transparent material, such as celluloid, and may be formed in any suitable shape or contour.

Mounted on the transverse bar D is an inclined key board plate K having on its face a set of characters or letters forming a duplicate set of the characters or letters on the master plate. The arrangement of sets of characters on the master plate and key board respectively is reversed in view of the travel of the carriage, and, as in this instance where the letter Z (inverted) is at the right of the row on the master plate, the corresponding indicating letter Z is placed at the left on the key board. The carriage is provided with an indicator 24 which is arranged to indicate on the key board just exactly what character on the master plate is desired to be brought into position in the axis of the lens, and since the indicator travels with the carriage the necessity for reversing the order of the sets of characters will be readily apparent. The numeral 24ª represents a hand piece which is provided to move the carriage when selecting the characters on the key board.

To aid in correctly locating the selected character or characters as they are brought into the axis, I provide suitable mechanism comprising in this instance a plate 25 disposed below the forward part of the carriage and extending between the side frame members, which plate is provided with countersunk centering apertures, 25ª, corresponding in number with those of the characters on the key board plate K, and located in alinement with the characters of the key board and master plate. The numeral 26 indicates a centering pin extending through an aperture formed in the front portion of the carriage, the pin and indicator 24 being located with respect to each other and disposed in the same vertical plane. The pin is provided with a button 26ª, and is normally held out of contact with the apertures 25ª through the provision of a spring 26ᵇ. It will be clear that if the carriage is moved to bring the indicator to a desired letter on the key board, that depression of the centering pin into the corresponding aperture brings that selected character on the master plate into an exact central position in the focal axis, since an alined relation exists between that aperture and the character so selected.

The preferred means for actuating the plateholder will now be described. Conveniently located at the front of the machine is a hand bar 27 pivotally mounted on a fulcrum 28 and provided with the lever arm 29 extending rearwardly in a direction toward the worm shaft 18, the lever arm being normally held down by the spring 28$^a$. Therefore, depression of the hand bar 27 will impart a vertical upward movement to the lever arm 29, which motion is translated to a step-by-step rotatory motion of the worm shaft by the interposition of suitable mechanism, as the bell crank lever 30, link 31, and lever 32, which is provided with a pawl 32$^a$ adapted to engage the teeth of a ratchet 33 when the hand bar is depressed, and to ratchet over the teeth when the bar is returned to normal position by the spring 28$^a$. The worm shaft is provided with a portion thereof extending outwardly beyond the ear 18$^a$, upon which portion the lever 32 and ratchet 33 is loosely mounted, the latter being integrally formed with a spur gear 33$^a$ which imparts movement to a differential gearing H adapted in turn to rotate the worm shaft at such varying surface speeds as may be desired.

The numeral 34 indicates a pawl pivoted at 34$^b$ on the lower bar 17 of the frame E, the pawl having lost motion connection with a spring held actuating rod 35 which is suitably mounted to horizontally move the frame, and with it the plate holder. Both rod and pawl have corresponding abutments 35$^a$ and 34$^a$ which serve to keep the face of the pawl in sliding engagement with the worm shaft as the latter is rotated. Consequently, at each depression of the hand bar 27 the plate 12 is caused to move a predetermined distance to bring a new portion of its surface in readiness to receive the photographic imprint of the succeeding selected character, or to effect a spacing between a series of words.

It will be understood that the differential H may, if desired, be omitted, but it is considered advantageous for the reason that the spacing referred to may be readily varied to suit. This variation is obtained through the key 36 which is slidable in a keyway formed in the member 37 so as to connect the gear $a$ with any one of the loose gears $b$ in mesh with the gears $d$, which latter are fast on the extended portion of the worm shaft 18 to turn it. As the plate reaches or nears the end of its travel, (which is determined by the length of the worm) the actuating rod 35 is moved inwardly to return the plate to the starting point, the initial movement of the rod taking up the lost motion to release the engagement of the abutments 34 and 35$^a$ whereby the pawl is disengaged from the worm to permit the entire movement of the plate to take up its new position. The moment that the rod 35 is relieved of pressure the abutments re-engage to force the pawl against the worm through the action of the spring indicated at 35$^b$, whereupon manipulation of the hand lever 21 elevates the plate to bring a new line into place.

Stops 38 are provided to limit the upward movement of the hand bar 27, and for the purpose of controlling the extent of its downward travel and consequently the movement of the ratchet 33, I preferably provide a spring-held pin 39 slidable vertically in a recess formed in a projecting portion 40 of the carriage which is disposed immediately under the hand bar 27. This pin, as in the manner shown, projects above the portion 40 in a direction toward the hand bar, so that irrespective of any positioning of the carriage, depression of the hand bar depresses the pin against its spring 39$^a$ until it abuts the transverse stop bar 40$^a$.

Assuming that the extent of hand bar down travel is equal to two teeth of the ratchet, compensation should be provided for differences in size widths of the letters I, W, M, with respect to the other letters of the alphabet; since otherwise absolute accuracy in spacing these said letters may not be obtained. With this end in view I preferably provide the stop bar with the compensating notches or recesses 41, 41$^a$, and the abutment 41$^b$, which are located with reference to the letters W, M and I respectively on the key board G. Consequently, with the indicator 24 at letter I on the key board, the hand bar 27 on depression actuates the pin 39 to engage the abutment 41$^b$ which is so arranged that the ratchet is moved a distance equal to one of its teeth. Similarly the ratchet moves three teeth when the pin is depressed into the notches 41 or 41$^a$, which as previously stated correspond to the wider letters M and W.

A reference to Figure 2 will show that the bell crank lever 30 has a dwell at or lost motion connection at 31$^a$ with the link 31, and is mounted on the stub shaft 42 to turn it on receiving motion from the lever 30. Mechanism is provided for opening the shutter 11, which is preferably operable by the motion transmitted to the stub shaft through the bell crank lever 30 and lever arm 29, and at a time prior to the taking up of the lost motion at 31$^a$. It is desired that the shutter be opened and closed, before any ratchet movement takes place, which as previously stated serves to space the imprinted selected character from the character intended to succeed it.

The shutter device 11 is normally held closed by the spring 43 which is connected to the shutter actuating rod 44, whose lower end is preferably connected to a bell crank lever 50 pivoted at 44ª. Fast with the stub shaft 42, and disposed at its inner end beneath the lens box, is a plate 45 having thereon a pivoted pawl 46 with its face normally held in engagement with an abutment formed on the free end of the bell crank by the shaft 42. On movement being imparted to the latter through depression of the hand bar 27, the pawl 46 snaps the lever 50 to open the shutter and disengages therefrom at once, whereupon the spring 43 closes the shutter and returns the levers 20 to normal position. Subsequently the lost motion at 31ª being taken up, motion is then imparted to the ratchet, and as the hand bar returns to normal position the pawl 46 slips under the abutment and is returned to engaged position by the light leaf spring 46ª, which is lighter than the spring at 43.

A series of master plates containing different sized letters or characters may be used, but I prefer to use a master plate of the character indicated in Figure 6 on which rows of different sized letters may be accommodated. Cams 47 mounted to slide on and turn with the splined shaft 22ᵇ bear against the lower edge of the master plate, and are operated by the hand lever 48 which is provided with a stop pin 48ª normally held inwardly to project in the apertures 49ª formed in the plate 49 mounted on the side member B. By this means, the lever 48 operates to bring into the focal range any size of letter desired.

In order to indicate when the end of the line on the plate is reached during the operation of reproducing the selected characters, and also the exact location where the next character will be imprinted on the plate, I provide a lined indicator plate 51 disposed to depend in front of the back plate C and mounted on a strap 52 to move freely with the plate holder 13, together with a stationary pointer 53 which is mounted on the back plate C and arranged with respect to the indicator plate 52 and the axis of the lens.

With the various parts of the machine positioned and operating substantially as set forth, and considering that it be desired to produce on the plate 12 the words —UNITED STATES— in the largest size type, the operation of the machine would be substantially as follows. The carriage is first moved on its bearings to bring the indicator in register with the letter "U" formed on the keyboard—which acts to simultaneously bring the corresponding and inverted letter "U" on the master plate—into the axis of the lens. The centering pin is then depressed to positively insure accuracy in the positioning of the letter thus brought into the axis, whereupon the hand bar 27 is depressed to obtain in quick succession: first, the opening and automatic closing of the shutter device 11 which permits the photographic flash reproduction of the letter "U" in its customary form on that portion of the plate then in the axis; and, second, the communication of the ratchet and worm spacing movement to the plate in a horizontal plane to bring an unused and alined portion of the plate into the axis in readiness to receive the imprint of the next letter "N", which movement is registered on the indicator plate 51.

The carriage indicator is then moved to register with the letter "N" on the keyboard, and the operation already described is continuously carried out until the stated words are reproduced on the plate. In the case of the letter "I" the ratchet of course only moves one tooth, whereby to insure accuracy in the spaced relation of this letter with respect to the next letter "T", the space preferably being considered as extending between the left hand portions of adjacent letters. To space the words "UNITED" and "STATES" the hand bar only is depressed, as will be readily apparent.

Should it be desired to use smaller sized letters or numerals when placed on the master plate as I have them, it will be obvious that all that is required is to actuate the hand lever, and elevate, through the cam action involved, the master plate to bring into range that size of type required. In using the small type letters the operation is exactly the same, and the operator may, if desired, vary the spacing by manipulating the key 36 which acts through the differential gearing H to effect a change in surface speed of the worm. When the end of a line is reached and a new line is to be brought into place, the plate 12 is elevated by actuation of the hand lever 21 and then returned to the beginning of a new line by the application of hand pressure to the rod 35.

I desire to claim broadly as new the provision of an apparatus contemplated within the purview of my invention, and operating to bring a succession of selected letters or characters into the axis of a lens for photographic reproduction on a sensitized surface disposed for movement in the focal plane of the lens. I do not intend, however, to restrict myself to details of construction as shown, nor to the precise arrangement of the various parts, for it will be obvious that variations may be made therefrom without in any way departing from the spirit and scope of my invention. Such equivalent construction as variations in the character or contour of the master plate, the nature of radiant employed, or the insertion of optical lenses between the selected letters and the sensitized surface to enlarge or reduce the size of the character, are considered to come within the scope of my invention, as more particularly pointed out in the appended claims.

Having thus described my invention and illustrated its use, what I claim as new and desire to secure by Letters Patent, is the following:—

1. In a machine of the character described, and in combination, a suitably supported lens, a sensitized member movable in the focal plane of the lens, and a character bearing means constructed and arranged with reference to said lens for bringing a number of selected characters of an unrelated series successively into the axis of said lens for their reproduction as a related subject matter on the sensitized member.

2. In an apparatus of the character described, the combination of a frame, a suitably supported lens, a sensitized member movable in the focal plane of the lens, and a character bearing device containing a series of unrelated characters and constructed and arranged with reference to said frame and said lens for bringing certain characters of the series at will into the axis of said lens for their reproduction in spaced relation on the sensitized member as a related subject matter, substantially as and for the purpose set forth.

3. In an apparatus of the character described, the combination of a frame, a suitably supported lens, a sensitized member movable in the focal plane of the lens, a character bearing device in said frame having a series of independent characters and movable to bring selected characters of the series successively into the axial range of the lens for their reproduction in spaced relation on the sensitized member, and an indicator member disposed in said frame in operative relation with said character bearing device for selecting the characters desired for reproduction.

4. In an apparatus of the character described, the combination of a frame, a suitably supported lens, a sensitized member movable in the focal plane of the lens, a character bearing device in said frame having a series of unrelated characters and movable to bring selected characters of the series successively into the axial range of the lens for their reproduction in spaced relation on the sensitized member, and actuating means operatively connected with the said member for moving the same a predetermined distance to take up a new position with reference to the axis of the lens as each character is reproduced.

5. In an apparatus of the character described, the combination of a frame, a suitably supported lens, a sensitized member movable in the focal plane of the lens, a character bearing device in said frame having a series of unrelated characters and movable to bring selected characters of the series successively into the axial range of the lens for their reproduction in spaced relation on the sensitized member, actuating means operatively connected with the said member for moving the same a predetermined distance to take up a new position with reference to the axis of the lens as each character is reproduced, and means for indicating the changed position of the said member.

6. In an apparatus of the character described, and in combination with a sensitized member, of a suitably supported lens in whose focal range the sensitized member is to be moved, a character bearing device mounted in front of the lens and movable relatively of its support to bring selected characters of an unrelated series successively into the axial range of the lens for their reproduction in a desired related succession on the sensitized member, and means for actuating the lens in phase with the successive movements of the said device.

7. In an apparatus of the character described, and in combination, a frame, a lens supported therein, a character bearing device mounted in the frame with reference to said lens comprising a master plate containing two or more duplicate rows of different-sized characters, one of which is normally in horizontal alinement with the axis of the lens, means in operative relation with said plate for vertically raising the latter relatively of the frame to displace the alined row of characters and to position the other row in alinement, substantially as described.

8. In a machine of the character described, the combination of a photographic lens, a device for holding a sensitized plate disposed for horizontal displacement in the focal plane of said lens, means adapted to successively bring into the axis of the said lens a selected number of series of unrelated characters or letters for photographic reproduction on the plate, and spacing means operatively connected with the plate holding device for imparting intermittent movement in phase to the plate as the letters are being reproduced.

9. In a machine of the character described, the combination with a frame, of a suitable lens mounted in said frame, means for bringing a series of characters successively into the axial range of said lens including a carriage movable in said frame, and coöperating members on the frame and carriage for substantially simultaneously selecting and entering the characters desired to be thus brought into the range of the lens.

10. In a machine of the character described, the combination with a frame, of a suitable lens mounted in said frame, means for bringing a series of characters successively into the axial range of said lens including a carriage movable in said frame, and means in operative relation with said carriage for centering the characters in the approximate axis of the lens.

11. In a machine of the character described, the combination with a sensitized plate, of a frame, a lens box, means mounted in said frame for bringing a selected character into the axis of the lens for its reproduction on said plate, a plate holder movable in the focal plane of the lens, and a common means operating to first actuate the shutter of the lens and then the plate holder.

12. In a machine of the character described, the combination of a frame, a lens carried on said frame, a character bearing member and means mounted in said frame and in operative relation with said member for centering each character in the axis of the lens.

13. In a machine of the character described, the combination of a lens and a plate holder therefor, means for successively bringing characters or letters into the axial range of the said lens, actuating means for imparting an intermittent spacing movement to the plate holder, and compensating means interpoesd in said actuating means for varying the space for one or more of the characters.

14. In an apparatus of the character described, a lens mounted in a suitable support, a plate holder movable relatively of said support and actuating means for said plate holder comprising a manually depressible spring-held lever, and connections between the latter member and the plate holder arranged to impart an intermittent spacing movement to the holder in the plane of lens support.

15. In combination, a lens mounted in a suitable support, a plate holder movable in the focal plane of said lens, and actuating means for imparting an intermittent horizontal spacing movement to the holder, said means being variable to vary the extent of spacing movement, substantially as described.

16. The combination with a sensitized plate, of a lens mounted on a suitable support, means adjacent said support for carrying the plate with reference to the axis of the lens, said means comprising a movable frame and a plate holder slidable therein, actuating means normally engaging with the frame and adapted to impart an intermittent movement to the plate in a horizontal plane whereby it is caused to move from one alined position to another in the focal plane of the lens, means for returning said frame and holder to the first position, and means for vertically moving the plate holder in the frame, substantially as described.

17. In combination with a sensitized plate, of a suitably supported lens, a plate holder movable in the focal plane of the lens, means constructed and arranged with reference to said lens and holder for bringing a series of selected letters successively into the axis of the lens for their reproduction in spaced relation on said sensitized plate, and mechanism coöperating with the last mentioned means for varying the length of the space between adjacent letters on the plate, substantially as described.

18. In combination, a main frame, a lens supported on said frame, a plate holder disposed adjacent said lens, a frame for carrying the plate holder, means for imparting intermittent spacing movement to the plate holder frame comprising a screw shaft journaled in the main frame and actuating means connected with said shaft, said holder frame operatively engaging the said shaft whereby on actuation of the last mentioned means the frame is moved from one limiting position to another limiting position, and means disengaging the holder frame and shaft for returning the former to the first mentioned position.

19. In a flash lettering machine, a frame, a lens and radiant supported in juxtaposition in the frame, a stationary key-board containing characters, a carriage movable in said frame relatively of the key-board and provided with an indicator for indicating a selected character on said key-board, and a character bearing member mounted in said carriage, said carrier being movable to bring the selected character into the path of light, substantially as described.

20. In an apparatus of the class described, the combination with a lens and a sensitized plate, of a holder for said plate, means for bringing a series of characters or letters successively into the path of light for their reproduction by the lens in spaced relation on said plate, means for imparting a normal spacing movement to the holder as certain characters in the series are so reproduced, and means co-acting therewith for varying the space for other characters of the series.

In testimony whereof I have hereunto signed my name in the presence of the two subscribed witnesses.

GUSTAF F. BAGGE.

Witnesses:
 JOHAN WASGE,
 FRANCE PETERSON.